Oct. 28, 1941. J. W. EKSTEDT ET AL 2,260,891
APPARATUS FOR PRODUCING EYELETS
Filed Feb. 6, 1940 9 Sheets-Sheet 1
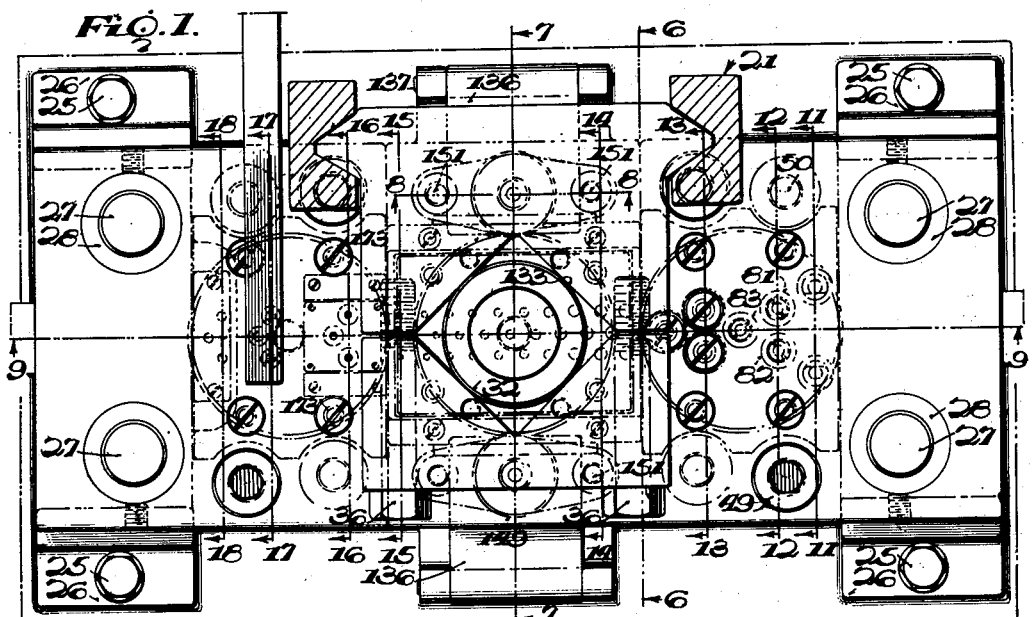
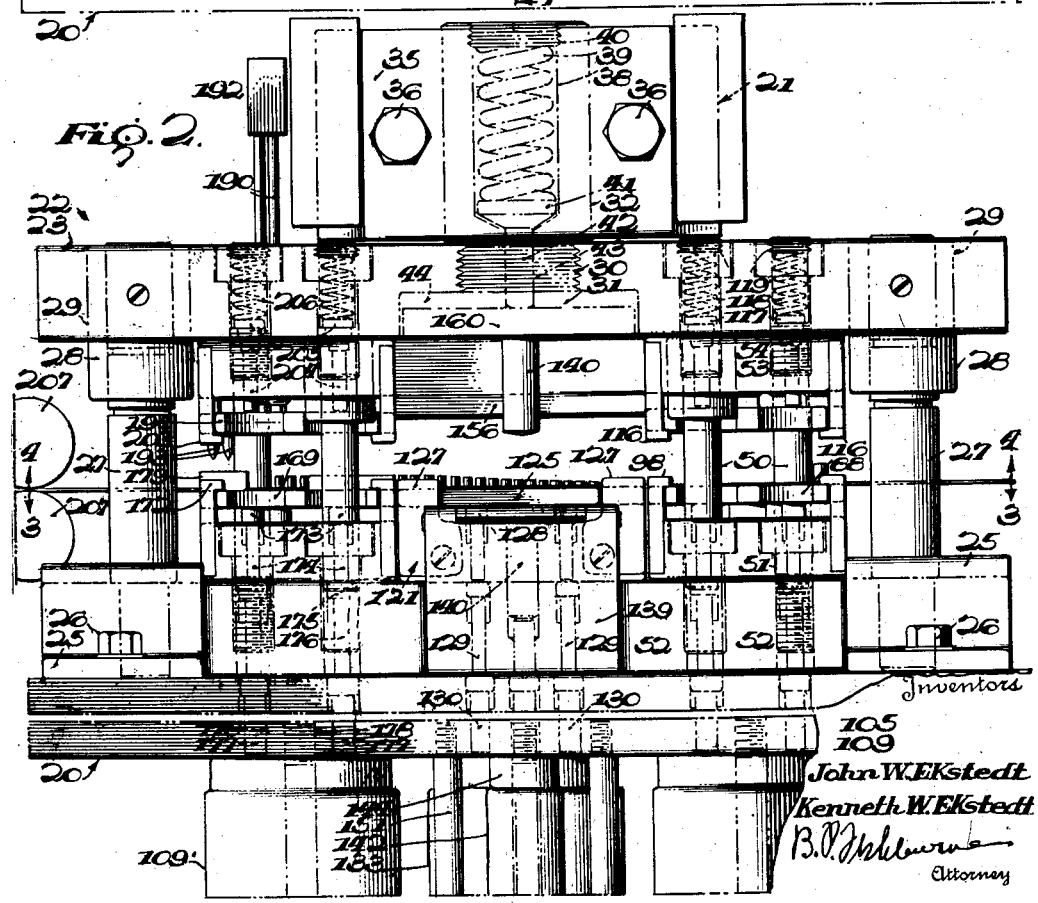
Inventors
John W. Ekstedt
Kenneth W. Ekstedt
Attorney Oct. 28, 1941.    J. W. EKSTEDT ET AL    2,260,891
APPARATUS FOR PRODUCING EYELETS
Filed Feb. 6, 1940    9 Sheets-Sheet 2

Inventor
John W. Ekstedt.
Kenneth W. Ekstedt.

By B. Welborn
Attorney

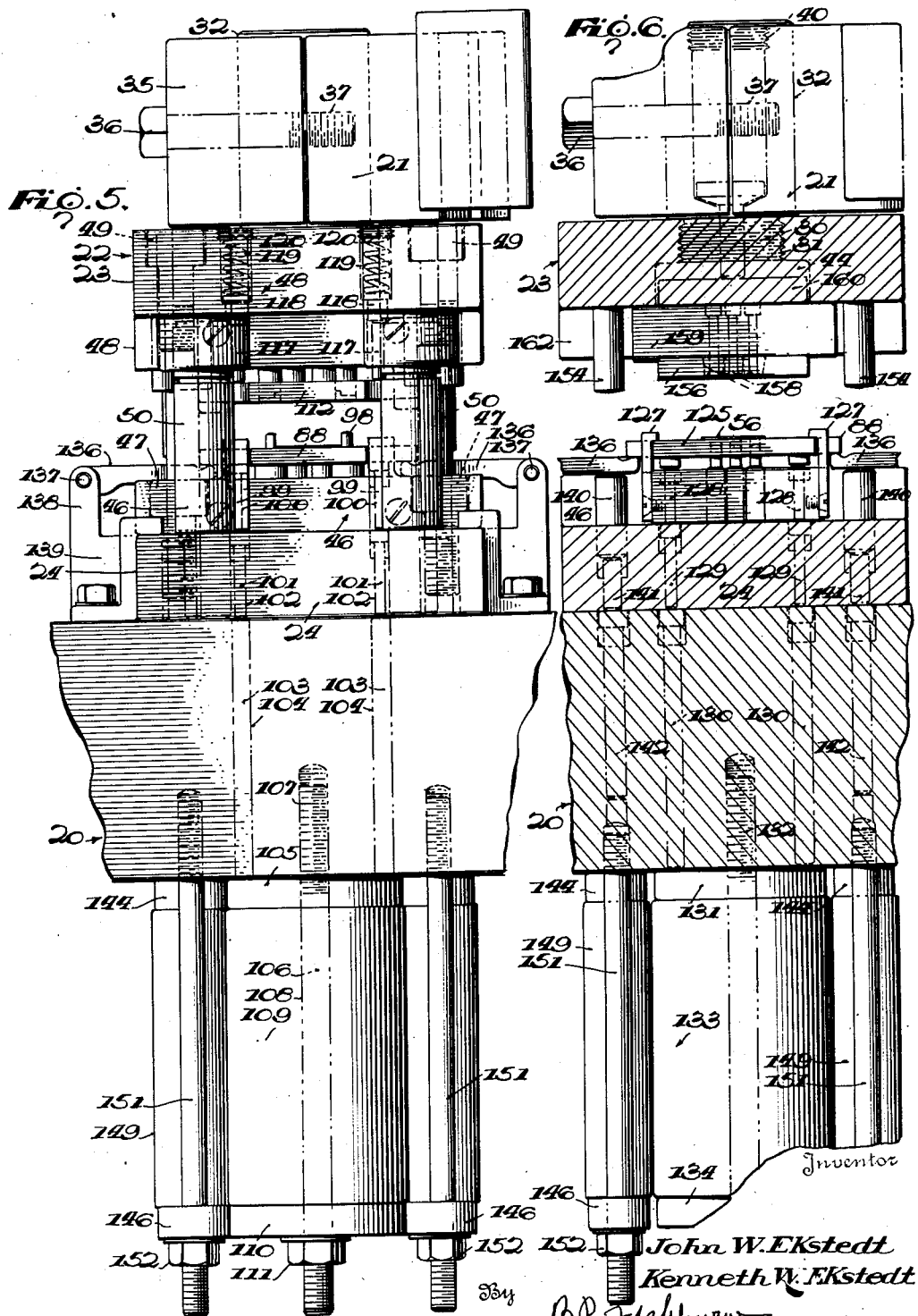

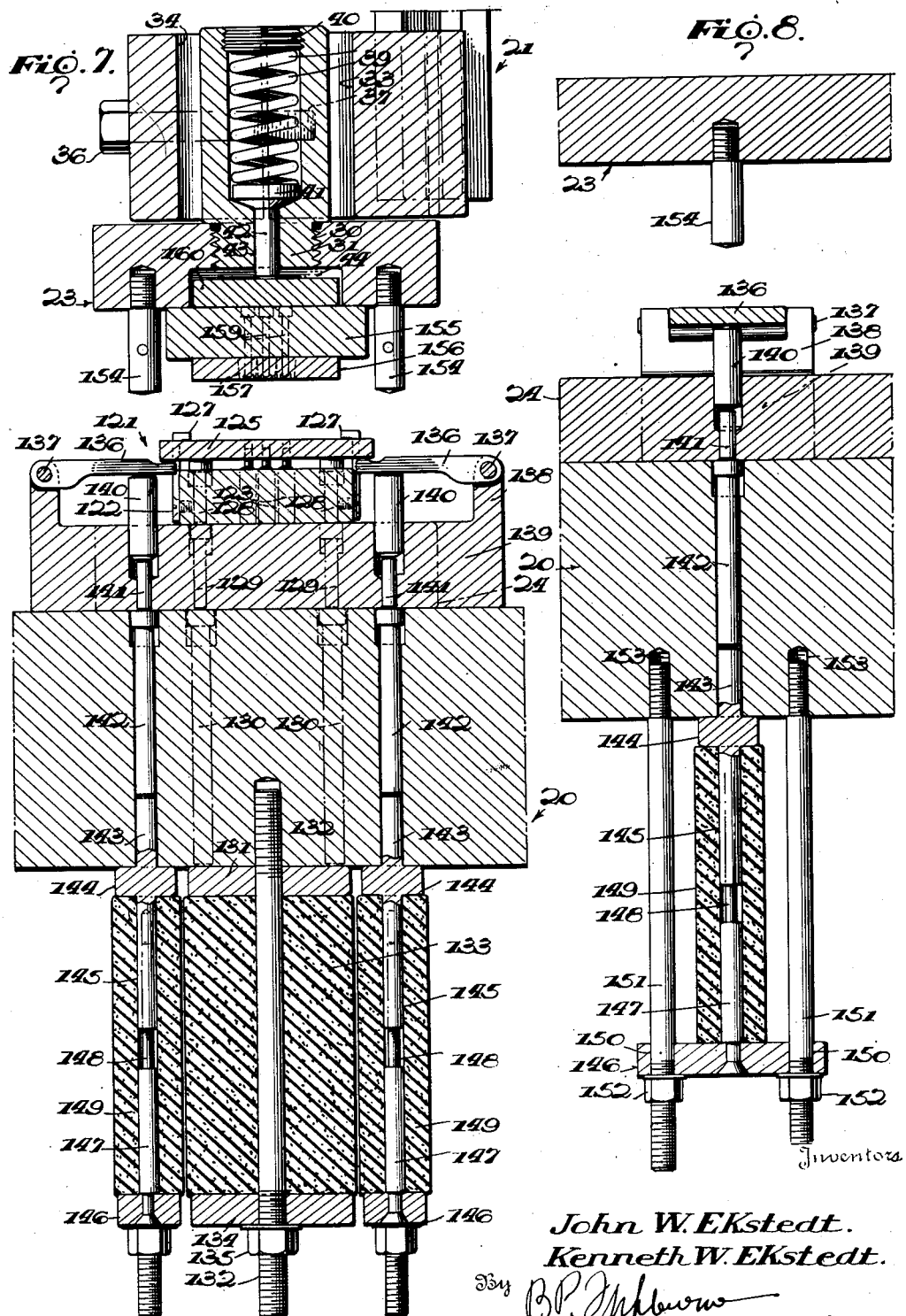

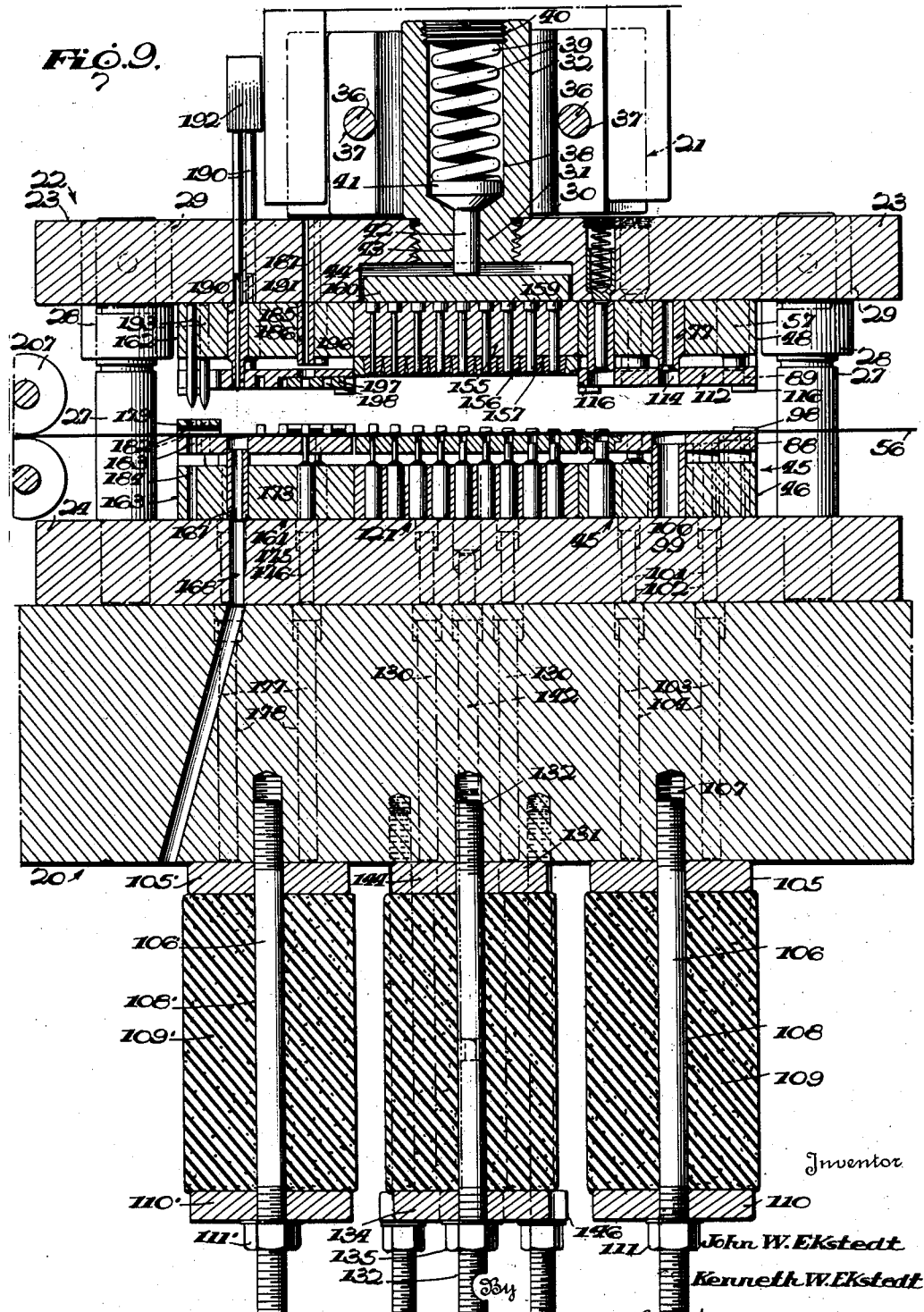

Oct. 28, 1941.  J. W. EKSTEDT ET AL  2,260,891
APPARATUS FOR PRODUCING EYELETS
Filed Feb. 6, 1940  9 Sheets-Sheet 6
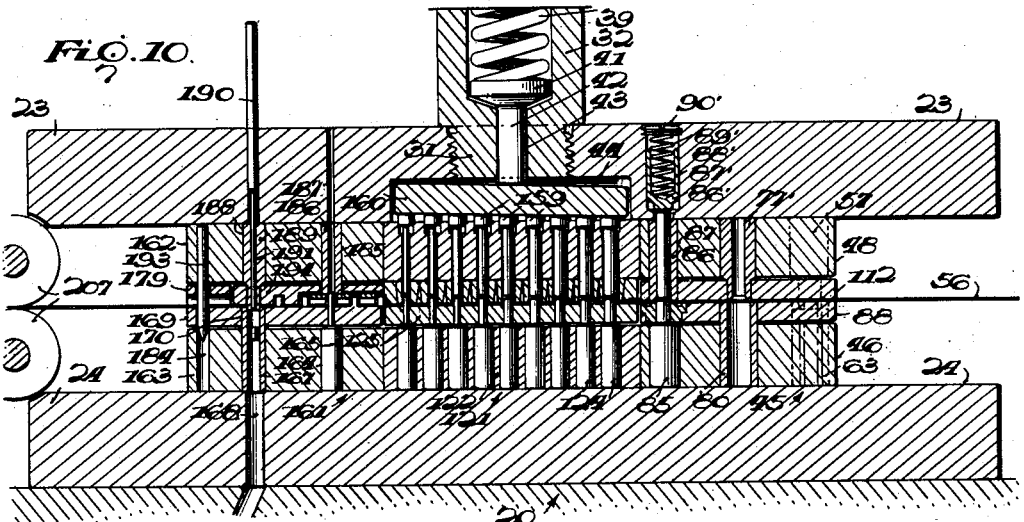
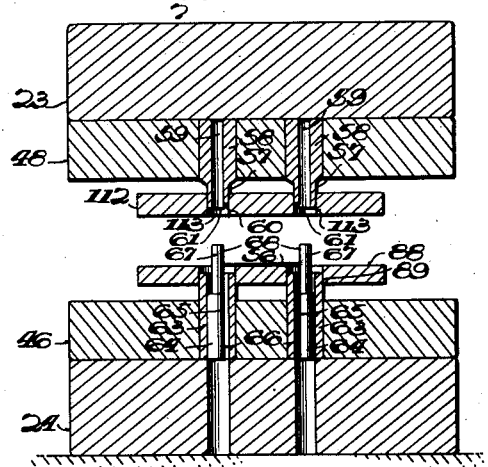
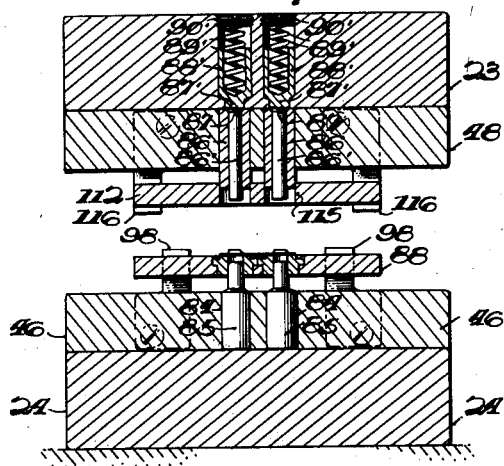
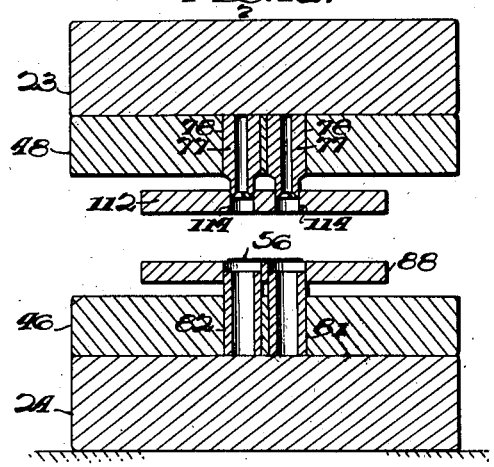
Inventor
John W. Ekstedt.
Kenneth W. Ekstedt.
By B. P. Ikklewen
Attorney Oct. 28, 1941.    J. W. EKSTEDT ET AL    2,260,891
APPARATUS FOR PRODUCING EYELETS
Filed Feb. 6, 1940    9 Sheets-Sheet 7
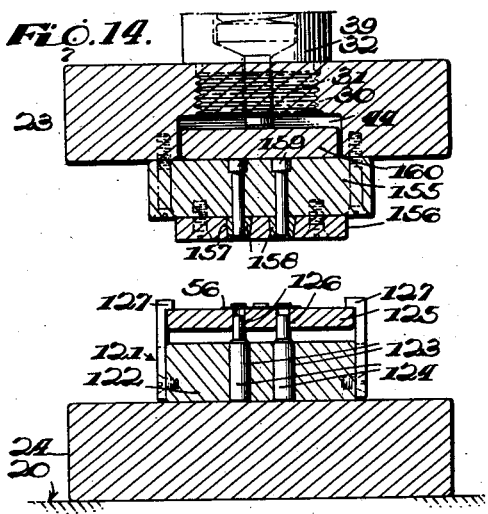
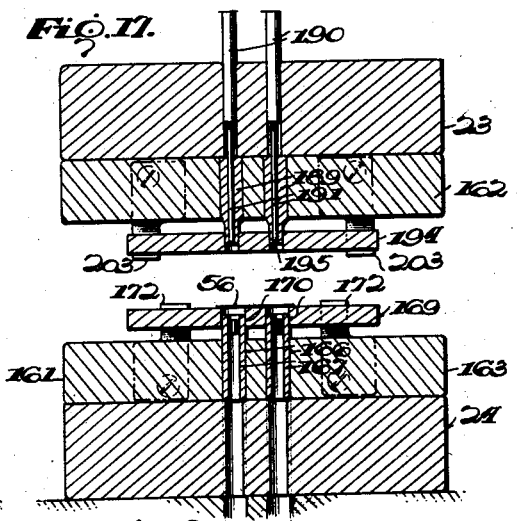
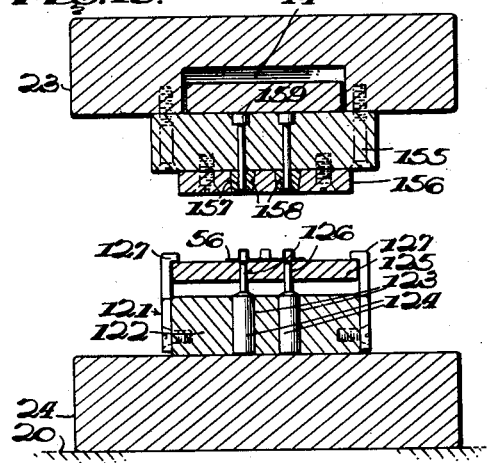
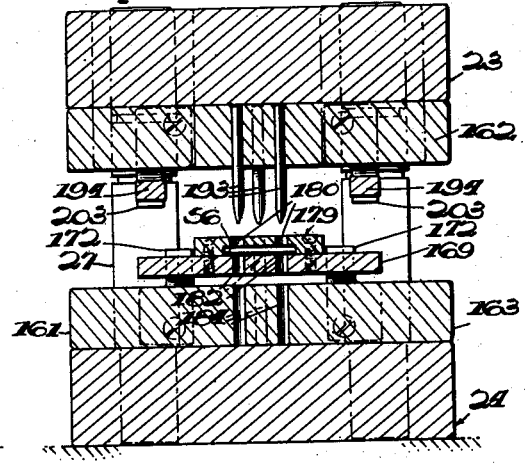
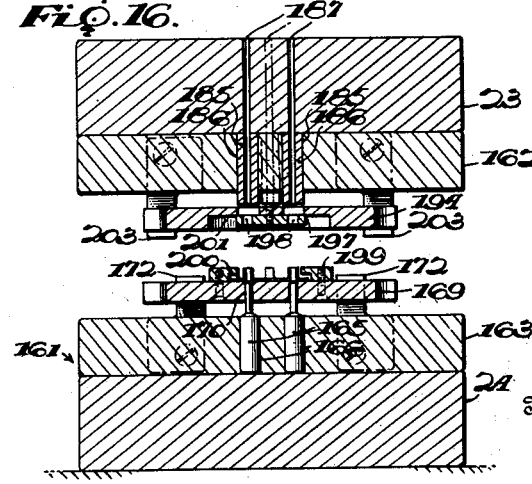
Inventor
John W. Ekstedt
Kenneth W. Ekstedt.
By B. P. Fishburn
Attorney

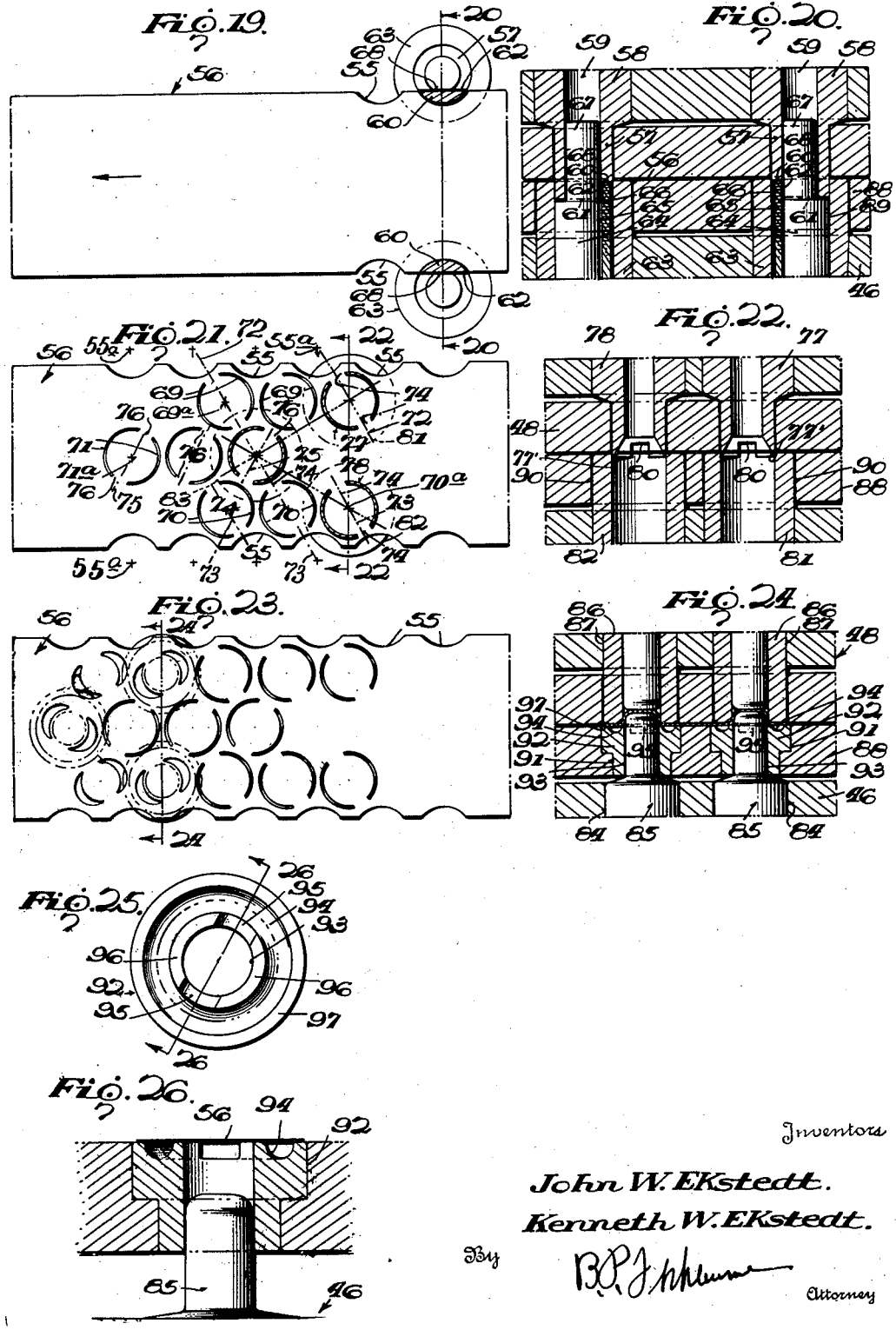

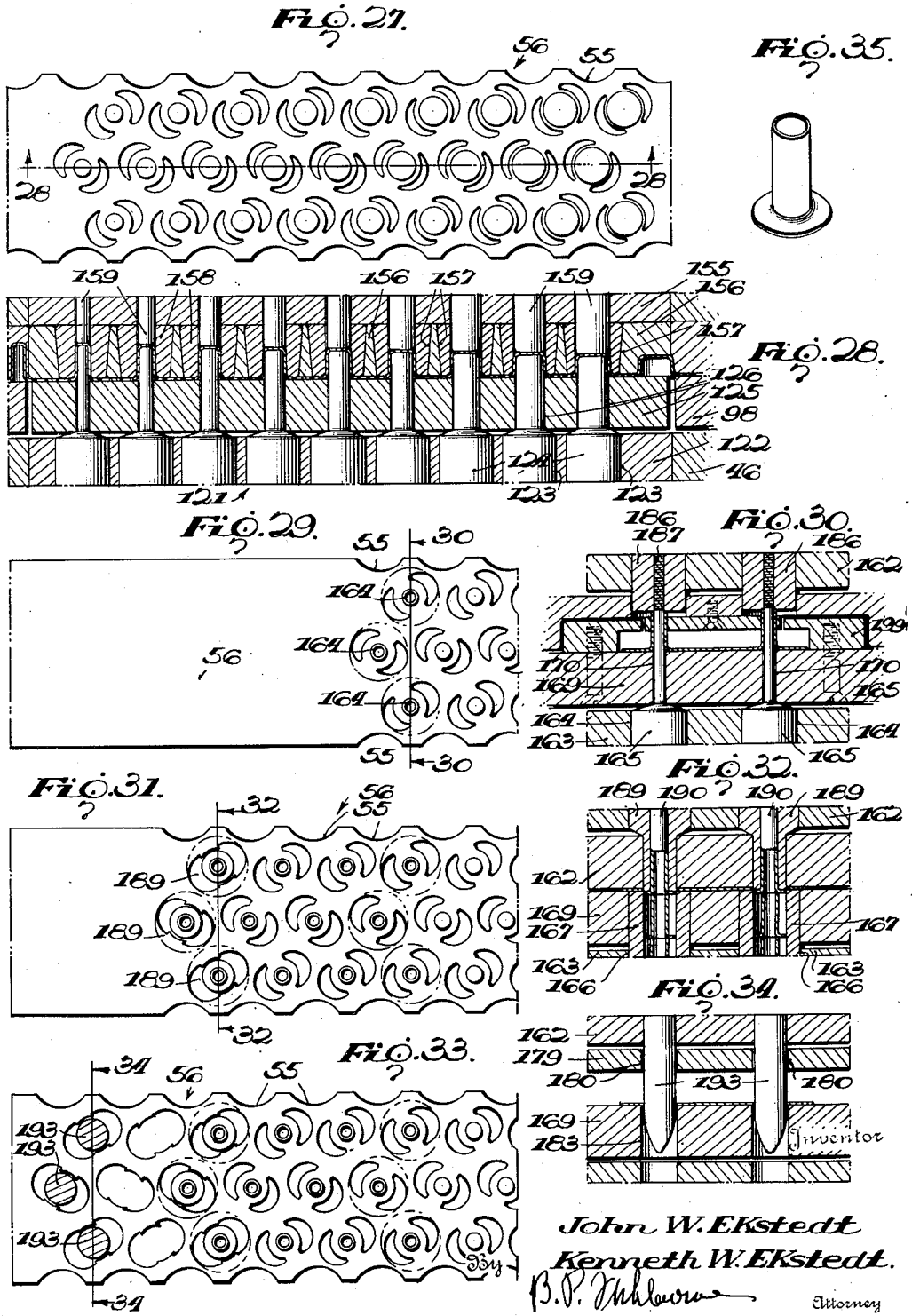

Patented Oct. 28, 1941

2,260,891

UNITED STATES PATENT OFFICE 2,260,891

APPARATUS FOR PRODUCING EYELETS

John W. Ekstedt and Kenneth W. Ekstedt, Union, N. J., assignors to General Eyelet Supply Company, Inc., Roselle Park, N. J., a corporation of New Jersey Application February 6, 1940, Serial No. 317,604

24 Claims. (Cl. 113—40)

Our invention relates to an apparatus for producing eyelets or the like.

An important object of the invention is to provide an apparatus of the above mentioned character whereby eyelets may be formed from a blank or strip of metal, by deep drawing, and separated from the blank or strip subsequent to their completion.

A further object of the invention is to provide an apparatus of the above mentioned character whereby the eyelets may be formed by deep drawing, without tearing or disrupting the material of the completed eyelet.

A further object of the invention is to provide an apparatus of the above mentioned character whereby a plurality of eyelets are completed upon each cycle of operation.

A further object of the invention is to provide an apparatus of the above mentioned character which will produce a plurality of groups of partly completed eyelets, and subject each group in succession to a drawing operation for completing the eyelets in such group.

A further object of the invention is to provide means to guide or center the work, during its feeding movement so that the drawing and punching operations will be properly performed.

A further object of the invention is to provide yielding means to oppose the movement of the stripper during the drawing operation and yielding means of increased tension or stiffness for moving the stripper during the stripping action.

A further object of the invention is to provide a machine of the above mentioned character having units which stamp or cut the metal, which units are removable as such for the grinding of the cutting parts.

A further object of the invention is to provide resilient means for opposing the movement of the stripper, which means is of simple construction and may be accurately and readily adjusted to various tensions.

A further object of the invention is to provide means for slitting the sheet or strip in such a manner that the metal will be properly drawn in all directions, during the subsequent drawing operation or operations.

A further object of the invention is to provide means for notching the edges of the strip so that the notches and slits will coact in effecting the proper drawing of the metal during the drawing operation or operations.

Other objects and advantages of the invention will be apparent during the course of the following description.

In the accompanying drawings forming a part of this application and in which like numerals are employed to designate like parts throughout the same, Figure 1 is a plan view of the apparatus, Figure 2 is a side elevation of the same, parts broken away, Figure 3 is a horizontal section taken on line 3—3 of Figure 2, looking down in the direction of the arrow, Figure 4 is a similar view taken on line 4—4 of Figure 2, looking upwardly in the direction of the arrow, Figure 5 is a rear end elevation of the apparatus, Figure 6 is a vertical transverse section taken on line 6—6 of Figure 1, Figure 7 is a similar view taken on line 7—7 of Figure 1, Figure 8 is a longitudinal vertical section taken on line 8—8 of Figure 1, Figure 9 is a longitudinal vertical section taken on line 9—9 of Figure 1, Figure 10 is a view similar to Figure 9, showing the parts in the closed position, Figure 11 is a transverse section taken on line 11—11 of Figure 1, Figure 12 is a similar view taken on line 12—12 of Figure 1, Figure 13 is a similar view taken on line 13—13 of Figure 1, Figure 14 is a similar view taken on line 14—14 of Figure 1, Figure 15 is a similar view taken on line 15—15 of Figure 1, Figure 16 is a similar view taken on line 16—16 of Figure 1, Figure 17 is a similar view taken on line 17—17 of Figure 1, Figure 18 is a similar view taken on line 18—18 of Figure 1, Figure 19 is an enlarged view of the metal ribbon, showing the notching of the edges of the same, Figure 20 is a transverse vertical section taken on line 20—20 of Figure 19, Figure 21 is an enlarged plan view of the metal ribbon, showing the same fed forward for the next step and slit, Figure 22 is a transverse section taken on line 22—22 of Figure 21, Figure 23 is a plan view of the strip, showing the same fed forward to the next step and illustrating the first drawing operation, Figure 24 is a transverse vertical section taken on line 24—24 of Figure 23, Figure 25 is an enlarged plan view of the die included in the first drawing device, Figure 26 is a section on line 26—26 of Figure 25, Figure 27 is a plan view of the metal strip, showing a succession of drawing operations, Figure 28 is a vertical section taken through the drawing device on line 28—28 of Figure 27, Figure 29 is a plan view of the ribbon illustrating the punching out of the ends of the drawn eyelets, Figure 30 is a transverse vertical section taken on line 30—30 of Figure 29, Figure 31 is a plan view of the ribbon, showing the drawn eyelets in the leading position blanked from the ribbon, Figure 32 is a transverse section taken on line 32—32 of Figure 31, Figure 33 is a plan view of the ribbon, showing the same moved to the next step illustrating the operation of the centering pins.

Figure 34 is a transverse section taken on line 34—34 of Figure 33, and,

Figure 35 is a perspective view of the finished eyelet.

Figure 3:
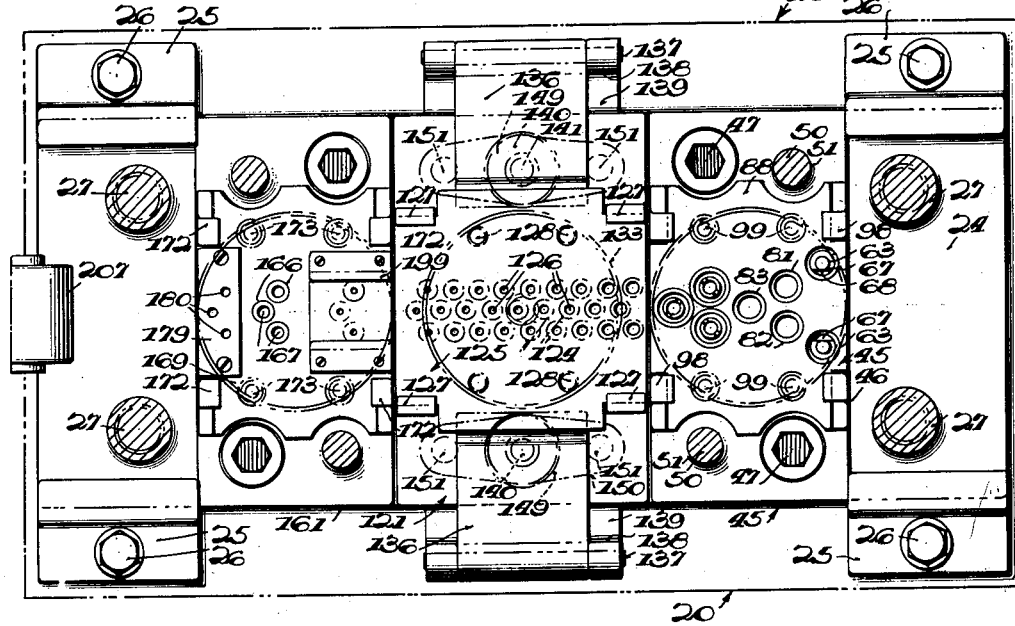

In the drawings, wherein for the purpose of illustration is shown a preferred embodiment of our invention, Figures 1, 2, 5, and 9, the numeral 20 designates a preferably stationary bed of a power press, having a coacting ram 21, which is moved toward and from the bed 20, as is well known. Since the power press may be of any conventional construction no further description is deemed necessary.

Figure 4:
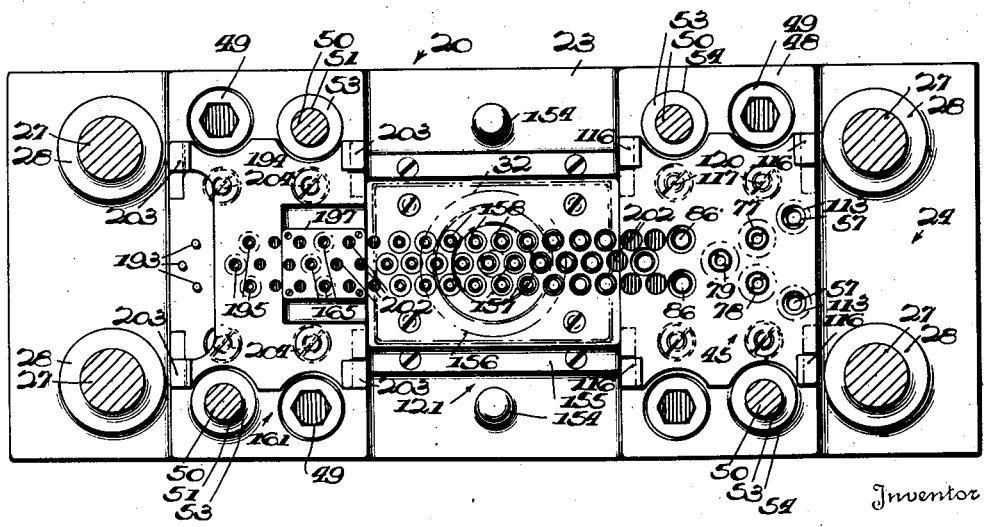

Mounted within the power press is a sub-press 22, Figures 6, 9, 11, 12, and 13, comprising an upper shoe 23 and a lower shoe 24. The lower shoe is stationary with respect to the bed 20 and is rigidly secured thereto by clamps 25 in turn attached to the bed 20 by screws 26. The upper shoe 23 is raised and lowered with respect to the lower shoe and must be accurately guided during this movement, and to effect this four vertical guide pillars 27 are provided, Figures 2, 3, and 4, the lower ends of which are rigidly secured to the lower shoe 24 while their upper ends have a sliding fit within sleeves or bushings 28, rigidly held within openings 29, formed in the upper shoe 23. The pillars 27 and associated elements are arranged adjacent to the corners of the upper and lower shoes, as shown.

The upper shoe 23 is provided centrally thereof with a screw-threaded opening 30, Figure 9, to receive the reduced screw-threaded extension 31 of a shank 32. This shank is clamped to the ram 21 but may be separated therefrom when desired. To accomplish this, the ram 21 is provided upon its front face with a recess 33, Figure 1, which is preferably wedge-shaped in horizontal cross-section. This recess is arranged opposite a recess 34, also preferably wedge-shaped in horizontal cross-section and formed in a clamping block 35. The assembled recesses 33 and 34 receive therein the shank 32, which is clamped therein. Screws 36 pass through openings formed in the block 35 and engage within screw-threaded openings 37 in the ram, Figure 9. The top of the block 35 terminates substantially at the same elevation as the top of the shank. The shank 32 is tubular, Figure 9, affording a chamber 38, for receiving a heavy compressible coil spring 39, engaged at its upper end by a plug 40, having screw-threaded engagement within the shank 32, as shown. By turning the plug 40 the tension of the spring 39 may be adjusted. Arranged within the bottom of the tubular shank 32 is a plunger 41, disposed beneath the spring 39, and urged downwardly by the same. The plunger 41 has a reduced plunger extension 42 mounted to reciprocate within a vertical opening 43, and projecting downwardly into a recess 44, formed upon the lower face of the upper shoe 23, and centrally thereof.

The numeral 45 designates a sub-sub-press, arranged near the intake end of the machine, Figures 2, 3, 6, 9, 10, 11, 12, and 13. This sub-sub-press comprises a lower shoe 46, arranged upon the shoe 24, and rigidly clamped to the same by means of screws 47, passing downwardly through the upper surface of the shoe 46. The sub-sub-press 45 further comprises an upper shoe 48, rigidly secured to the shoe 23 by screws 49, passing downwardly through the upper surface of the shoe 23. The lower shoe 46 is relatively stationary and means are provided to accurately guide the upper shoe 48 when it is moved toward and from the lower shoe 46. This guide means comprises vertical pillars 50, the lower ends of which are rigidly held within openings 51 formed in the shoe 46 and project slightly below the shoe 46 to enter openings 52 formed in the shoe 24. The upper ends of the pillars 50 have a sliding fit within guide sleeves or bushings 53, rigidly held within openings 54, formed in the shoe 48. The sub-sub-press 45 is removable as a unit from the sub-press, and to effect this separation the screws 47 are removed and the screws 49 are removed and the shoe 46 is lifted slightly with respect to the shoe 24 so that the lower ends of the pillars 50 are withdrawn from the openings 52. When this is done, the sub-sub-press including the connected shoes 46 and 48 may then be moved laterally from within the sub-press. This sub-sub-press carries elements which cut or punch the work and these elements must be ground or sharpened and this sub-sub-press is therefore removable as a unit to provide ready access to these parts.

The sub-sub-press 45 is provided with means to form notches or cuts 55, Figure 19, upon an elongated strip or ribbon 56, from which the eyelets or the like are to be formed. This strip 56 ordinarily has a thickness of .005 of an inch although the same may vary. The strip 56 is formed of any suitable metal which can be drawn, such as nickel, copper, steel, brass, zinc, or the like. The strip or ribbon 56 is fed longitudinally in the direction of the arrow and the notches 55 are formed in succession in transverse pairs. The means which forms the notches comprises a pair of notching punches 57, Figures 3, 11, 19, and 20, which are rigidly held within openings 58, formed in the upper shoe 48. The notching punches are tubular and have cylindrical bores 59, Figure 20. The notching punches 57 have a straight cutting edge 60 and generally semi-cylindrical depending extensions 61, Figure 11, having inner straight vertical faces 62. The cutting edges 60 face inwardly with respect to the strip or ribbon 56 to cut the curved notches 55 therein. The notching punches 57 enter dies 63, rigidly held within the lower shoe 46, when the upper shoe 48 is moved toward the lower shoe, and the extensions 61 enter the dies 63 before the notching edge 60 engages with the strip or ribbon to notch the same. Arranged within the dies 63 are plugs 64, which are cylindrically curved, and have their inner portions cut away providing flat faces 65, which afford segmental passages 66 to receive the blanks which are stamped when the notches 55 are produced and these blanks are fed downwardly through the passages. The plugs 64 are provided with reduced cylindrical extensions 67, at their upper ends, which are concentric with the plugs 64 and have their inner faces cut away to provide flat faces 68. The flat faces 68 serve as guides for the strip or ribbon 56. The extensions 67 project above the dies 63 and enter the bores 59 of the notching punches, when these notching punches move downwardly. It is thus apparent that the faces 68 serve to properly guide or center the strip or ribbon 56 before the notching punches descend. When the notching punches are in the uppermost position they are separated from the plug extensions 67.

The sub-sub-press 45 also has means, Figures 3, 12, 21, and 22, for forming pairs of circularly curved concentric slits 69, 70, and 71 in the strip or ribbon 56 and this means is arranged in advance of the notch producing devices. The slits 69 may be regarded as formed upon opposite sides of a diagonal line 72 and the slits 70 upon the opposite sides of a diagonal line 73 and the lines 72 and 73 are parallel. These slits form webs 74, between their ends whereby the material of the strip within the slits remains attached to the strip. The slits 71 are arranged upon the opposite sides of a diagonal line 75 and the line 75 is arranged transversely of or generally at a right angle to the lines 72 and 73. The slits 71 form webs 76, between their ends and these webs retain the material within the slits attached to the strip or ribbon 56. As the triangular groups of pairs of slits are produced in succession the arrangement is produced as shown in Figure 21. The outer webs 74 will pull material from the notches 55. The inner webs 74 will pull material from the slits 71, and the webs 76 will pull material from the inner slits 69 and 70. Particular attention is called to the fact that the thicknesses of the webs 74 between the material surrounded by the slits 69 and 70 and the edges of the notches 55 and the thicknesses of the webs 76 between the material surrounded by the slits 71 and the inner slits 70, and the thicknesses of the webs between the material surrounded by the slits 69 and the adjacent slits 71 and the thicknesses of the webs between the material surrounded by the slits 70 and the adjacent slits 71 are all substantially equal. All of these webs have substantially the same radial dimension. The notches 55 also form a triangular group with the triangular group of pairs of concentric slits, and the centers of the notches and the centers of the pairs of slits are equidistantly spaced upon the sides of the triangular group. The means for producing the pairs of slits 69, 70, and 71 in the triangular group comprises three slitting punches 77, 78, and 79, arranged in a triangular group and rigidly held in openings in the upper shoe 48. Each of these slitting punches, Figures 4, 12, 21, and 22, has a pair of diametrically oppositely arranged notches 80, and these notches produce the webs 74 and 76. The notches 80 in the slitting punches 77 and 78 are arranged at the same angle while the notches 80 of the slitting punch 79 are arranged transversely of or at generally 90° to the notches of the other two slitting punches. The slitting punch 77 enters a die 81, the slitting punch 78 enters a die 82, and the slitting punch 79 enters a die 83. These dies 81, 82, and 83 are arranged in a triangular group and are rigidly held within openings formed in the lower shoe 46. The slitting punches are tubular so that they may be beveled upon their inner sides providing sharp straight cutting edges 77', Figure 22. The notching punches 57 from a triangular group with the slitting punches 77, 78, and 79 and the centers of the notching punches and slitting punches are equidistantly spaced upon the sides of the triangular group.

The sub-sub-press 45 is provided with a triangular group of drawing devices to perform the first drawing operation, Figures 3, 13, 23, and 24. The drawing is done upwardly and the lower shoe 46 has a triangular group of openings 84 within which are rigidly held a triangular group of drawing punches 85. These drawing punches are arranged to enter a triangular group of dies 86 rigidly held in openings 87 formed in the upper shoe 48. Each die 86 for the drawing punch includes a plunger 86' to contact with the top of the eyelet being formed. The plunger 86' is prevented from dropping out by a flange 87' and it is moved downwardly by a plunger 88' moved down by a spring 89' having its tension regulated by a screw-threaded plug 90'. The function of the plunger 86' is to remove the partly drawn article from within the die 86, when the upper shoe 48 is elevated.

A stripper 88, Figures 13, 24, 25, and 26, is provided for the drawing punches 85 and the slitting dies 81, 82, and 83, and the notching punches 57. The stripper 88 has openings 89 to receive the dies 63 of the notching devices. The stripper also has openings 90 to receive the dies 81, 82, and 83 of the slitting devices. The stripper 88 has a triangular group of recesses 91 within which are mounted bushings 92, rigidly held in place therein. The upper faces of the bushings are flush with the upper face of the stripper 88. Each bushing is tubular and has a central bore 93 to receive the drawing punch 85. The bushing is cylindrical and is provided upon its upper face with an annular groove 94 and diametrically oppositely arranged notches 95. The notches 95 are so angularly arranged that they assume positions over the webs 74 and 76 so that no binding action accurs at these webs and the annular groove 94 is arranged over the slits 69, 70, and 71. The segmental faces 96 of the bushing 92 will contact with the strip 56 entirely within the slits and up to but not beyond the ends of the slits while the annular face 97 of the bushing will contact with the strip 56 in a zone outwardly of the slits. The slits and the webs are therefore left sufficiently free so that the metal may be drawn evenly in all directions during the drawing process. The upward movement of the stripper 88 is limited by stationary brackets 98, arranged at the corners thereof. The stripper is moved upwardly, Figure 5, by four plungers 99 operating within vertical openings 100 in the shoe 46, and the plungers 99 are moved upwardly by plungers 101 operating within openings 102 formed in the shoe 24. The plungers 101 are moved upwardly by plungers 103 operating within vertical openings 104 formed in the bed 20. The lower ends of the plungers 103 engage a washer 105, carried by a rod 106 screw-threaded within an opening 107 within the bed 20. The rod 106 passes through an opening 108 formed in a resilient cylinder 109, formed of rubber or the like. The lower end of the rubber cylinder 109 engages a washer 110 engaging a nut 111, screw-threaded upon the lower end of the rod 106. The washer 105 is movable longitudinally of the rod 106 and the tension of the rubber cylinder 109 may be regulated by adjusting the nut 111. The rubber cylinder 109 serves as resilient means to elevate the stripper 88, and the tension of this force may be adjusted by turning the nut 111, as is obvious.

The numeral 112 designates a stripping plate arranged adjacent to the upper shoe 48. This stripping plate has openings 113 to receive the notching punches 57. It also has a triangular group of openings 114 to receive the slitting punches 77, 78, and 79. It further has a triangular group of openings 115 to receive the dies 86 for the drawing punches 85, Figures 3, 11, 12, 13. The downward movement of the stripper 112 is limited by stationary brackets 116, rigidly secured to the upper shoe 48. The stripper 112 is moved downwardly by reciprocatory plungers 117, Figure 5, in turn moved downwardly by reciprocatory plungers 118 forced downwardly by compressible coil springs 119 having their tension regulated by screw-threaded plugs 120.

Arranged in advance of the sub-sub-press 45 is a sub-sub-press 121, Figures 2, 7, 9, 10, 27, and 29, comprising a lower shoe 122, which may be permanently rigidly secured to the shoe 24 by screws or the like. The shoe 122 is provided with triangular groups of vertical openings 123 receiving and rigidly holding triangular groups of drawing punches 124, facing upwardly, as shown. Arranged adjacent to the drawing punches 124 is a stripper 125, having triangular groups of vertical openings 126 to receive the drawing punches. As stated, the punches 124 are arranged in triangular groups, and the punches in each group have the same diameter and the same height, but the punches in the succeeding triangular groups decrease in diameter and increase in vertical dimension, and the openings 126 decrease in diameter accordingly, Figure 29. When the stripper 125 is in the lowermost position, all punches 124 project above the same. The upward movement of the stripper 125 is limited by stationary brackets 127, secured to the shoe 122. The stripper 125, Figure 6, is raised by vertical reciprocatory plungers 128 operating within openings formed in the shoe 122. The plungers 128 are raised by plungers 129 operating within openings formed in the shoe 24. The plungers 129 are raised by vertical reciprocatory plungers 130 operating within vertical openings formed in the bed 20. The plungers 130 engage a washer 131 carried by a vertical rod 132 which is rigidly secured to the bed 20. The rod 132 carries a resilient rubber cylinder 133 and a lower washer 134 engaged by a nut 135, having screw-threaded engagement with the lower end of the rod 132. Arranged upon opposite sides of the shoe 122, Figure 7, and beneath the stripper 125 are levers 136, pivotally connected at 137 with knuckles 138, carried by blocks 139, rigidly attached to the shoe 24 by any suitable means. The levers 136 are moved upwardly by vertical reciprocatory plungers 140, in turn moved upwardly by vertical reciprocatory plungers 141. These plungers 141 are moved upwardly by vertical reciprocatory plungers 142. Each plunger 142 has its lower end contacting with a plunger 143 integral with a washer 144 and this washer carries a depending tube 145 integral therewith. The numeral 146 designates a rigid strap having a vertical rod 147 rigidly attached thereto at its center and this rod has a reduced extension 148 rigidly attached thereto which is slidable within the bore of the tube 145. A resilient rubber cylinder 149 is carried by the tube 145 and rod 147 and is arranged between the washer 144 and the strap 146. The strap is provided at its opposite ends with openings 150, slidably receiving vertical rods 151, having screw-threaded ends, receiving nuts 152. The upper ends of the rods 151 are screw-threaded within openings 153 formed in the bed 20. By adjusting the nuts 152 the tension of the rubber cylinder 149 is regulated, as is obvious. It is thus seen that the two rubber cylinders 149 yieldingly press the levers 136 upwardly which in turn act upon the stripper 125 to raise it. The stripper 125 is therefore raised by the combined action of the rubber cylinder 133 and the rubber cylinders 149.

The levers 136 are depressed by fingers 154, rigidly attached to the shoe 23. When the shoe 23 moves downwardly the fingers 154 shift the levers 136 downwardly so that the stripper 125 is relieved of the upward yielding pressure from the rubber cylinders 149, before the stripper 125 is moved downwardly, thus reducing the upward yielding pressure on this stripper.

The sub-sub-press 121, Figures 4, 7, 9 and 28, comprises an upper shoe 155 which is permanently and rigidly secured to the shoe 23 by screws or the like. Arranged upon the lower face of the shoe 155 is an attaching plate 156, having openings 157. These openings are circular in cross-section and tapered and decrease in diameter downwardly. The attaching plate 156 is rigidly secured to the shoe 155 by screws or the like. Rigidly held within the openings 157 are dies 158, correspondingly tapered. These dies are formed of very hard metal. The dies 158 are arranged in triangular groups, corresponding to the group arrangement of the drawing punches 124 and the openings of the dies are of suitable diameters to properly receive the drawing punches so that they will perform a drawing operation. The diameter of the openings of the dies in each triangular group are therefore the same but the diameters in the succeeding groups decrease, as described in connection with the drawing punches.

The numeral 159 designates reciprocatory ejectors, corresponding in number and arrangement to the dies 157, and operating within the same. The ejectors are of course arranged in triangular groups and the diameters of the ejectors in each group are the same, but the diameters of the ejectors in succeeding groups decrease in a forward direction, as explained in connection with the drawing punches 124. All of the ejectors are moved downwardly by a common plunger 160, urged downwardly by the plunger 42.

The numeral 161 designates a sub-sub-press, Figures 2, 3, 4, 9, 10, 15, 16, 17, 18, and 30, including upper and lower shoes 162 and 163 which are detachably mounted upon the shoes 23 and 24 respectively in a manner similar to the mounting of the shoes 48 and 45 and it is therefore thought to be unnecessary to again describe this mounting. The sub-sub-press 161 may be removed from between the shoes 23 and 24 by a lateral movement as explained in connection with the sub-sub-press 45. The shoe 163 has a triangular group of vertical openings 164, rigidly holding upwardly facing end-piercing punches 165, Figure 30, arranged in a triangular group. The shoe 163, Figure 17, also has a triangular group of vertical openings 166, rigidly holding dies 167 of blanking or separating devices. The dies 167 are tubular and their bores register with vertical openings 168 at the bottom so that the completed eyelets blanked or separated from the strip pass downwardly from the dies 167 and through the openings 168.

Arranged above the shoe 163 is a stripper 169, having vertical openings 170 to receive the end-piercing punches 165 and vertical openings 171 to receive the dies 167. The upward movement of the stripper 169 is limited by stationary brackets 172, secured to the shoe 163. The stripper 169 is raised by plungers 173, Figures 2, 3, 9. The plungers 173 operate within vertical openings 174 formed in the shoe 163 and are moved upwardly by plungers 175 operating within vertical openings 176 in the shoe 24. The plungers 175 are moved upwardly by plungers 177 operating within vertical openings 178 formed in the bed 20. The dies 167 are arranged between the plungers 175, as shown.

Arranged above and spaced from the stripper 169 is a bridge 179, having a triangular group of openings 180. This bridge is rigidly secured to the stripper 169 by screws 181 and the bridge is held spaced from the stripper by blocks 182. The triangular group of openings 180 are in alignment with a triangular group of openings 183 formed in the stripper 169, and the triangular group of openings 183 are in alignment with a triangular group of openings 184, formed in the shoe 163.

The upper shoe 162, Figures 4, 9, 17, 16, and 30, of the sub-sub-press 161 is provided with vertical openings 185, rigidly holding dies 186, to receive the end-piercing punch 165. The bores of the die 186 are in registration with a vertical opening 187, formed in the shoe 23 and passing to the upper surface thereof. When the punch 165 pierces the hole in the end of the eyelet being formed, a small blank is stamped out and these blanks work upwardly through the opening 187 and discharge therefrom.

The shoe 162, Figure 17, is provided with a triangular group of vertical openings 188, receiving a triangular group of blanking or separating punches 189, arranged to enter the dies 167. These punches blank or separate the completed eyelet from the strip or ribbon and force the same into the bores of the dies 167 and they are fed through the openings 168. Since the punches 189 blank or cut and do not draw, there is little, if any, tendency for the separated completed eyelets to stick to the punches 189. However, we provide an ejector 190 in connection with each punch 189 and this ejector operates within an opening 191 in the punch. The ejector extends above the shoe 123 and when the shoe is moved to the elevated position the ejector contacts with a stationary trip 192 and is moved downwardly with relation to its punch and should an eyelet stick to the punch it will eject the eyelet from the punch. This eyelet would fall upon the stripper 169 and be blown therefrom by air pressure which is constantly directed upon the stripper for this purpose. The shoe 162 also has vertical openings for receiving vertical guide pins 193 which are rigidly held therein and project below the shoe 162. These guide pins are arranged in a triangular group and will enter the aligned openings 180, 183, and 184 and the openings formed in the strip or ribbon 56 after the eyelets are blanked or separated therefrom. These pins thus serve to guide or center the strip or ribbon to prevent displacement of the same.

The numeral 194 designates an upper stripper, Figures 4, 9, 16, 17, and 30, having a triangular group of openings 195 to receive the blanking or separating punches 189. The stripper 194 also has a triangular group of openings 196 to receive the dies 185. The stripper 194 has an opening 179' to receive the bridge 179. The numeral 197 designates a centering or guiding plate, having a triangular group of openings 198 to receive the partly formed eyelets, and accurately center them with relation to the end-piercing punches 165 and the dies 185. The plate 197 is rigidly secured to the stripper 194. The punches 165 enter the openings of the dies 185 and the dies 185 move down to substantial contacting relation with the centering plate 197. The upper ends of the eyelets may extend above the centering plate for a slight distance so that they will contact with the dies 185. Arranged upon opposite sides of the triangular group of punches 165 are stripping plates 199, fixedly secured to the lower stripper 169. These stripping plates have recesses 200 for receiving the edges of the strip or ribbon outwardly of the partly formed eyelets. Should there be any tendency for the eyelets to stick within the openings 198 when the stripper 194 is raised, these eyelets will be moved out of the openings by the action of the strip or ribbon engaging beneath the stripping plates 199. The centering plate 197 is arranged within a recess 201 and is secured to the stripper 194 by screws or the like and the stripping plates 199 also pass into this recess 201.

We provide dead openings 202 to receive the eyelets, so that they will not be squashed.

The downward movement of the stripper 194 is limited by stationary brackets 203 which are secured to the shoe 162. The stripper 194 is moved downwardly by plungers 204, moved downwardly by plungers 205, forced downwardly by springs 206.

The strip or ribbon is fed intermittently or step by step through the machine, from right to left and this intermittent feeding movement may be effected by rollers 207. The strip or ribbon must be moved each step, a distance corresponding to the distances between the centers of the eyelets being formed in one triangular group and the centers of the eyelets being formed in the next leading triangular group. This will cause all of the devices to properly function.

The operation of the machine in the practice of the method is as follows:

The leading end of the strip or ribbon 56 is presented to the right or intake end of the machine, Figures 9 and 10, and the ribbon is fed longitudinally in a step-by-step manner. The shoe 23 is moved downwardly to effect the various operations upon the work while the ribbon is at rest between the steps of the feed movement, after which the shoe 23 is raised and the ribbon is advanced for the next step. The reciprocation of the notching punches 57, produce in succession the transverse pairs of circularly curved notches 55, at the opposite longitudinal edges of the ribbon 56. The notches 55 have centers 55ᵃ, and these centers are equidistantly spaced, and the ribbon is fed each step for a distance equal to the distance between an adjacent pair of centers 55ᵃ. After the first pair of notches 55 has been made, the ribbon being fed one step for this purpose, the ribbon is then fed two steps and when the third pair of notches is made the first triangular group of pairs of slits 69, 70, and 71 are made, and triangular groups of slits are formed in succession. The pairs of slits are circularly curved, concentric and have centers 69ª, 70ª, and 71ª. The center 71ª of the pair of slits at the apex of the triangular group is in the leading position and at the central longitudinal axis of the strip or ribbon 56. Starting from any pair of notches 55, as 1, and counting to the third pair of notches 55 forwardly, it will then be seen that the centers 55ª of the third pair of notches are in transverse alignment with the center 71ª. The triangular groups of pairs of slits overlap, and the centers 71ª of the pairs of slits 71 are spaced for a distance equal to the distance between the pairs of centers 55ª of the notches. The centers 55ª, 69ª, 71ª, and 70ª are all equidistantly spaced, longitudinally and transversely of the ribbon 56. It is thus apparent that before the drawing operation is started, a stamped blank is provided having the circularly curved notches at its edges and the pairs of circularly curved concentric slits arranged in triangular groups, which overlap, and disposed in a definite relation with respect to the pairs of notches. As the feeding movement of the ribbon continues, each triangular group of pairs of slits reaches the first drawing punches 85 and these drawing punches and their coacting dies produce the partly drawn upstanding eyelets then having the maximum diameter and the minimum height. Upon the succeeding step or steps in the feeding of the ribbon, these upstanding partly drawn eyelets enter the dead openings and then pass over the first group of drawing punches 124 and when the shoe 156 again descends this set of drawing punches coacts with the dies 157, to further draw the eyelets, decreasing their diameter and increasing their height. When the shoe 156 rises, the ejectors 159 force the eyelets from the dies 157 and the stripper 125 frees them from the punches 124. Each triangular group of eyelets is acted upon in succession by the triangular groups of punches 124, while the ribbon is fed through the sub-press 121. By the time the leading group of eyelets reach the leading group of drawing punches 124 and are acted upon thereby, the eyelets in the leading group will have the minimum diameter and the maximum height. The next step or steps of the strip brings the leading group of eyelets into the dead openings 202 at the rear of the end-piercing punches 165, and the next step of the strip or ribbon brings this leading group of eyelets over the end-piercing punches 165, and when the shoe 162 again descends, the punches 165 punch holes in the closed ends of the eyelets and the blanks thus produced pass through the openings 187. The leading group of eyelets with the ends punched out now move for step or steps into the dead openings 202 and the next step brings them beneath the blanking or separating punches 189. When the punches 189 descend, the shank of the eyelets enter the openings in the punches 189 while the punches enter the openings of the dies 167 and blank or cut the flanges of the eyelets from the strip or ribbon and these eyelets are introduced into the openings of the dies 167 and their flanges engage therewith. As the punches 189 rise, the eyelets ordinarily move out of the openings of the punches 189 by virtue of the frictional engagement between the flanges of the eyelets and the dies 167 and feed downwardly through the openings of the dies. However, should a separated eyelet occasionally remain within the opening of one of the punches 189, it is forced therefrom by the ejector 190, which is a slight ejector and moved downwardly as the shoe 23 rises, since the ejector engages the stationary trip 192.

During the drawing operation of the eyelets by the drawing punches 124, the eyelets and strip or ribbon rest upon the stripper 125, and as the drawing dies descend, the fingers 154 depress the levers 136 before the drawing dies receive or engage the eyelets, thus reducing the upward yielding action or tension upon the stripper 125. The single rubber cylinder 132 will now exert the proper yielding pressure upon the stripper. If too much yielding pressure were exerted upon the stripper, there would be a tendency for the partly formed eyelets to be squashed before they could be further drawn. However, an increased yielding pressure is desired to return the stripper 125 to the raised position to withdraw the eyelets from the several stripping punches, and as the fingers 154 rise, they disengage levers 136, and the combined action or tension of the three rubber cylinders is transmitted to the stripper, to produce an increased yielding upward force applied thereto.

It is to be understood that the form of the machine herewith shown and described is to be taken as a preferred example of the same, and that various changes in the shape, size, and arrangement of parts may be resorted to without departing from the spirit of our invention or the scope of the subjoined claims, and that various changes in the order of the steps of the method may be resorted to, and various changes may be made in the arrangement of parts of the formed blank, without departing from the spirit of the invention or the scope of the subjoined claims.

Having thus described our invention, what we claim is:

1. In a machine for forming eyelets from a strip which can be drawn comprising, means to guide and feed the strip longitudinally, means to slit the strip inwardly of the notches, a plurality of drawing punches to act in succession upon the same portions of the strip which are adjacent to the slits, a stripper for the drawing punches, yielding means to move the stripper toward the free ends of the punches, a corresponding number of dies, means to move the dies toward the punches, and means to reduce the strength of the yielding means when the dies move toward the punches.

2. In a machine for forming eyelets from a strip which can be drawn comprising, means to guide and feed the strip longitudinally, means to notch the strip at its edges, means to slit the strip inwardly of the edges, a plurality of drawing punches to act in succession upon the same portions of the strip which are adjacent to the slits, a stripper for the drawing punches, a yielding device to move the stripper toward the free ends of the punches, a separate yielding device to move the stripper toward the free ends of the punches, drawing dies corresponding in number and arrangement to the drawing punches, means to effect a relative closing movement between the drawing dies and drawing punches, and means operated upon the relative closing movement between the drawing dies and the drawing punches for stopping the action of the separate yielding device upon the stripper.

3. In a machine for forming eyelets from a strip which can be drawn, means to guide and feed the strip longitudinally, means to notch the strip at its edges, a plurality of slitting devices to slit the strip inwardly of the notches, a plurality of groups of drawing punches to act in succession upon the same portions of the strip which are adjacent to the slits, a stripper for the drawing punches, yielding means to move the stripper toward the free ends of the drawing punches, groups of drawing dies corresponding in number and arrangement to the drawing punches, means to effect relative opening and closing movements between the drawing dies and drawing punches, and means to automatically increase the strength of the yielding means when the last-named means is operated to effect a relative opening movement between the drawing dies and drawing punches.

4. In a machine for forming eyelets from a strip which can be drawn, means to guide and feed the strip longitudinally, a group of slitting devices to slit the strip, a plurality of groups of drawing punches to act in succession upon the same portions of the strip which are adjacent to the slits, a stripper for the drawing punches, yielding means to move the stripper toward the free ends of the punches, a pivoted lever engaging the stripper to move the same toward the free ends of the punches, resilient means to move the lever toward the free ends of the punches, a plurality of groups of drawing dies corresponding in number and arrangement with the groups of drawing punches, means to effect a relative closing movement between the drawing dies and drawing punches, and an element operated by the last-named means to move the pivoted lever and separate the same from the stripper.

5. In a machine for making eyelets from a strip which can be drawn, a sub-press including opposed shoes, a sub-sub-press arranged within the sub-press, said sub-sub-press including punching devices to stamp notches in the edges of the strip, a group of spaced slitting punches for stamping a group of spaced slits in the sheet, a group of spaced drawing punch devices to draw the material of the sheet adjacent to the slits, strippers for the elements of the various punches, the sub-sub-press being removable as a unit from the sub-press, a sub-sub-press arranged within the sub-press in advance of the trailing sub-sub-press and including a plurality of groups of drawing devices having punches, a stripper for the punches of the drawing devices, a sub-sub-press arranged within the sub-press in advance of the intermediate sub-sub-press and including a group of end-piercing devices including punches and a group of stamp-out devices including punches, stripping means for the punches of the end-piercing devices and the punches of the stamp-out devices, and means to effect the longitudinal travel of the strip.

6. In a machine for making eyelets from a strip which may be drawn, a shoe, a drawing punch carried by the shoe, a stripper device for the drawing punch having an opening to receive the punch and having an annular recess surrounding the punch in spaced relation forming an annular face, the annular face having notches formed therein, a second shoe arranged opposite the first shoe, a drawing die to receive the drawing punch, the drawing die serving to press the sheet against the inner annular face, means to separate the partly drawn eyelet from the drawing die, and means to move the stripper toward the free end of the drawing punch.

7. In a machine for making eyelets from a strip which may be drawn, means for cutting curved slits in the strip, the adjacent ends of the slits being spaced to provide a web, a drawing punch to act upon the strip within the curved slits, a stripper having an opening to receive the drawing punch, said stripper being provided with an annular groove to extend across the slits, said annular groove forming an annular face to engage with the strip inwardly of the slits, the annular face having a notch at the web between the slits, a tubular drawing die to receive the drawing punch and to press the strip against the annular face, and means to effect a relative closing movement between the drawing punch and drawing die.

8. In a machine for forming eyelets from a strip which can be drawn, means to feed and guide the strip longitudinally, a triangular group of spaced drawing punching devices, the drawing device at the apex of the triangular group being disposed at the central longitudinal axis of the strip, a stripper having a triangular group of openings to receive the drawing punches of the drawing devices, said stripper having a recess surrounding each opening in spaced relation thereto to form an engaging face which has a pair of oppositely arranged notches the pairs of notches at the base of the triangular group having their radial axes inclined with respect to the longitudinal axis of the strip and substantially parallel with each other and the pair of notches at the apex of the triangular group having their radial axis inclined transversely of the longitudinal axis of the strip and extending transversely of the radial axes of the notches at the base of the triangular group, a triangular group of tubular drawing dies to receive the drawing punches and arranged to press the strip against the inner annular faces, means to move the stripper toward the free ends of the drawing punches, and means to remove the partly drawn eyelets and strip from the drawing dies.

9. In a machine for forming eyelets from a strip that can be drawn, means to guide and feed the strip longitudinally, a triangular group of spaced slitting punches, the punch at the apex of the triangular group being at the central longitudinal axis of the strip, each punch having a pair of oppositely arranged notches, the notches at the base of the triangular group having their radial axes extending transversely of the longitudinal axis of the strip and arranged substantially parallel with relation to each other, the notches of the punch at the apex having their radial axis extending transversely of the said axes, a triangular group of slitting dies to receive the punches, a triangular group of spaced drawing punches arranged to act upon the strip adjacent to the slits after the slitting operation, the drawing punch at the apex of the triangular group being at the central longitudinal axis of the strip, a stripper device having a triangular group of openings to receive the drawing punches, said device having an annular groove surrounding each opening to provide an annular engaging face, each engaging face having a pair of oppositely arranged notches, the last-named notches being angularly arranged in a manner corresponding to the angular arrangement of the notches of the slitting punches, a triangular group of drawing dies to receive the drawing punches and to press the sheet against the engaging faces.

10. In a machine for forming eyelets from a strip that can be drawn, a pair of notching devices arranged adjacent to the longitudinal edges of the strip and including notching punches to stamp notches in the longitudinal edges of the strip, a triangular group of spaced slitting devices including slitting punches, each slitting punch having a pair of spaced opposed cutting edges to produce a pair of opposed curved slits and webs between the ends of the slits, the triangular group of slitting punches forming a larger triangular group with the notching punches, the notching punches being arranged at the base of the triangular group and the notching punches and the slitting punches being substantially equidistantly spaced longitudinally of the sides of the triangular group, triangular groups of drawing devices having drawing punches to successively act upon the strip adjacent to the slits to draw the eyelets and means to effect a step-by-step longitudinal movement of the strip, each step being substantially for the distance between the centers of an adjacent pair of notches.

11. In a machine for forming eyelets from a strip that can be drawn, means to guide and feed the strip longitudinally, a pair of notching devices arranged transversely of the strip and including notching punches to stamp notches in the edges of the strip, a triangular group of spaced slitting devices including slitting punches, the triangular group of slitting punches forming a larger triangular group with the notching punches, the slitting punch at the apex of the triangular group being disposed at the central longitudinal axis of the strip, each slitting punch having a pair of oppositely arranged notches, the radial axes of the notches of the slitting punches at the base of the triangular group being disposed at the same angle with respect to the longitudinal axis of the strip and the radial axis of the notches of the slitting punch at the apex of the triangular group extending transversely of said radial axes, a triangular group of slitting dies to coact with the slitting punches, a triangular group of drawing devices to act upon the strip after the same is slit, said drawing devices including a triangular group of drawing punches, the drawing punch at the apex of the triangular group being arranged at the central longitudinal axis of the strip, a stripper having a triangular group of openings to receive the drawing punches, said stripper having an annular groove surrounding each drawing punch and forming an inner annular engaging face, each annular engaging face having a pair of notches, the radial axes of the notches at the base of the triangular group being substantially parallel and the radial axis of the notches at the apex of the triangular group extending transversely of the last-named axes, drawing dies to receive the drawing punches and press the strip against the engaging faces, and means to separate the strip and partly formed eyelets from the drawing dies.

12. In a machine for forming eyelets from a strip that can be drawn, a pair of notching punches arranged adjacent to the longitudinal edges of the strip to stamp notches in the longitudinal edges of the strip, a pair of notching dies to receive the notching punches, a triangular group of slitting punches to act upon the strip after the same is notched, each slitting punch having a pair of spaced opposed cutting edges to produce a pair of opposed curved slits and webs between the ends of the slits, said triangular group of slitting punches forming with the notching punches a larger triangular group with the notching punches at the base of the triangular group, the notching punches and the slitting punches being equidistantly spaced longitudinally of the sides of the triangular group, a triangular group of slitting dies to receive the slitting punches, a triangular group of drawing punches to act upon the strip adjacent to the slits, a triangular group of drawing dies to receive the drawing punches, a stripper having openings to receive the notching dies, the slitting dies and the drawing punches, and a stripper to receive the notching punches, the slitting dies, and the drawing dies, plungers within the drawing dies to separate the partly formed eyelets therefrom, and means to effect a step-by-step longitudinal movement of the strip, the length of each step being substantially the distance between the centers of adjacent notches.

13. In a machine for forming eyelets from a strip that can be drawn, a press including a ram and a shoe, a sub-press including opposed shoes arranged within the press, one shoe of the sub-press having a screw-threaded opening and a recess, a tubular shank secured to the ram and having a screw-threaded extension engaging within the screw-threaded opening, a plunger mounted within the recess, a spring arranged within the shank and forcing the plunger inwardly, a plurality of drawing dies mounted upon the shoe within the recess, a corresponding number of plungers operating within the drawing dies and moved by the plunger, a plurality of drawing punches mounted upon the other shoe of the sub-press to enter the drawing dies, and a stripper having openings to receive the drawing punches.

14. In a machine for forming eyelets from a strip that can be drawn, a shoe, a plurality of end-piercing punches carried by the shoe, a stripper having openings receiving the end-piercing punches, yielding means to move the stripper toward the free ends of the punches, stripping plates secured to the stripper and having undercut grooves to receive the edges of the strip, a second shoe arranged opposite the first-named shoe, a plurality of tubular dies secured to the second shoe and arranged to receive the end-piercing punches therein, a stripper having openings to receive the dies, the last-named stripper having a recess to receive the stripping plates, and a guide plate secured to the last-named stripper and arranged within the recess and having guide openings to receive the eyelets.

15. In a machine for forming eyelets from a strip that can be drawn, means for feeding and guiding the strip longitudinally, a shoe, a plurality of stamp-out dies carried by the shoe, said shoe having a plurality of centering openings, a stripper having openings to receive the dies and centering openings to align with the first-named centering openings, a bridge carried by the stripper and having centering openings to align with the first-named centering openings, stamp-out punches to coact with the dies for stamping out the completed eyelets, a stripper for the stamp-out punches having a recess formed therein to receive the bridge, a shoe carrying the stamp-out punches, and centering pins carried by the second-named shoe and movable into all of the aligned centering openings.

16. In a machine for forming eyelets from a strip which can be drawn comprising, a drawing punch, a drawing die arranged opposite the drawing punch, a stripper to receive the strip thereon and movable from the free end of the drawing punch to separate the eyelet from the drawing punch, resilient means to moves the stripper toward the free end of the drawing punch, means to effect a relative closing movement between the drawing die and drawing punch, and means to reduce the strength of the resilient means when said relative closing movement occurs.

17. In a machine for forming eyelets from a strip which can be drawn comprising, a plurality of drawing punches, a corresponding number of drawing dies arranged opposite the drawing punches to coact therewith, a stripper for the drawing punches to receive the strip thereon and shiftable toward the free ends of the drawing punches to separate the eyelets from the drawing punches, resilient means to shift the stripper toward the free ends of the drawing punches, and means to effect a relative closing movement between the drawing dies and drawing punches and to reduce the strength of the resilient means.

18. In a machine for forming eyelets from a strip which can be drawn comprising, a plurality of drawing punches, a corresponding number of drawing dies arranged opposite the drawing punches to coact therewith, a stripper for the drawing punches and movable toward the free ends of the drawing punches to separate the eyelets therefrom, resilient means to move the stripper toward the free ends of the drawing punches, additional resilient means to move the stripper toward the free ends of the drawing punches, means to effect a relative closing movement between the drawing punches and the drawing dies, and automatic means actuated upon such relative closing movement to prevent the additional resilient means from acting upon the stripper.

19. In a machine for forming eyelets from a strip that can be drawn and has a pair of opposed slits and webs between the ends of the slits, a drawing punch to act upon the strip between the opposed slits, a drawing die disposed opposite the drawing punch to receive the drawing punch therein, a stripper for the drawing die and movable toward the free end of the drawing die, a stripper for the drawing punch and movable toward the free end of the drawing punch, the drawing punch stripper having an engaging face to contact with the strip within the opposed slits and to press the strip against the end of the drawing die, said engaging face having notches, arranged to be positioned over said webs, said engaging face having a recess upon its outer side to be positioned over the slits and notches.

20. In a machine for forming eyelets from a strip that can be drawn and being provided with opposed curved slits having their ends spaced and substantially opposed webs between the ends, a drawing punch to act upon the strip between and inwardly of the slits, a drawing die disposed opposite the drawing punch to receive the drawing punch therein, a stripper for the drawing die, a stripper for the drawing punch, the drawing punch stripper having a generally annular flange to contact with the strip between and inwardly of the slits to press the strip against the end of the drawing die, said flange having notches which are generally oppositely arranged and positioned to be disposed over the webs and a recess surrounding the flange, said recess being arranged over the slits and webs.

21. In a machine for making eyelets from a strip which can be drawn, means to form a longitudinal group of spaced pairs of curved slits in the strip, the curved slits in each pair being opposed and generally concentric and having their ends spaced to provide webs, certain of the webs being angularly disposed adjacent to the longitudinal edge of the strip, means to form a longitudinal group of spaced notches through the longitudinal edge of the strip, the notches extending longitudinally of the strip and disposed in staggered relation to the pairs of slits and arranged adjacent to and extending across the webs of the pairs of slits which are adjacent to the longitudinal edge of the strip, and a drawing device to act upon the strip between each pair of curved slits, the drawing device comprising a punch to engage with the material of the strip between the pair of curved slits, a stripper having an opening to receive the drawing punch and a face surrounding the punch and a recess surrounding the face, the punch surrounding face being arranged to engage with the strip inwardly of the pair of slits, the surrounding face having notches to cover the webs between the slits, a tubular drawing die to receive the drawing punch and to press the strip between the slits against the surrounding face, and means to effect a relative closing movement between the drawing punch and drawing die.

22. In a machine for forming eyelets from a strip that can be drawn, a pair of notching punches which are transversely spaced to be arranged adjacent to the longitudinal edges of the strip to stamp notches through the longitudinal edges of the strip, a pair of notching dies to receive the notching punches, a triangular group of slitting punches to act upon the strip, each slitting punch having opposed curved cutting edges and spaces between the ends of the cutting edges, a triangular group of slitting dies to receive the slitting punches, each slitting punch and its companion slitting die producing opposed curved slits having webs between their ends, the notching punches forming with the slitting punches a larger triangular group, the notching punches being disposed at the base of the triangular group and the notching punches and the slitting punches being equidistantly spaced longitudinally of the sides of the triangular group, a triangular group of drawing punches to act upon the strip within the slits, a triangular group of drawing dies to receive the drawing punches, a stripper having an opening to receive each drawing punch, said stripper having an engaging face to contact with the strip between the slits, said engaging face having notches arranged to be positioned over the webs between the slits, said engaging face having a recess upon its outer side arranged to extend over the slits, and means to effect a step-by-step longitudinal movement of the strip, the length of each step being substantially the distance between the centers of adjacent notches.

23. In a machine for forming eyelets from a strip that can be drawn, a shoe having a recess, a plurality of drawing dies mounted upon the shoe and arranged over the recess, a corresponding number of plungers operating within the drawing dies and adapted to extend into the recess, a plunger common to said plungers mounted within the recess and extending over the plungers of the drawing dies and adapted to be tilted within the recess, resilient means to move the common plunger toward the drawing die plungers, a plurality of drawing punches arranged to enter the drawing dies, a shoe carrying the drawing punches, and stripping means for the drawing punches.

24. In a machine for forming eyelets from a strip that can be drawn, a slitting device including a slitting punch having a pair of opposed curved blades which are spaced at their ends to provide notches, the slitting device forming opposed curved slits in the strip having their ends spaced for providing webs between such ends, a drawing device comprising a drawing punch to act upon the strip between the slits, an opposed drawing die to receive the drawing punch, a member having an opening to receive the drawing punch and having an engaging face to force the strip against the end of the drawing die, the engaging face contacting with the strip between and inwardly of the slits, said engaging face having inwarly of the slits, said engaging face having spaced notches arranged to be positioned over the webs, said member having a recess surrounding the engaging face, said recess extending over the slits.

JOHN W. EKSTEDT.
KENNETH W. EKSTEDT.